(12) United States Patent
Markelz et al.

(10) Patent No.: US 11,125,685 B2
(45) Date of Patent: Sep. 21, 2021

(54) APPARATUS AND METHOD FOR ANALYZING A SAMPLE

(71) Applicant: The Research Foundation for The State University of New York, Buffalo, NY (US)

(72) Inventors: Andrea G. Markelz, Buffalo, NY (US); Gheorghe Acbas, Milwaukee, WI (US); Katherine A. Niessen, Buffalo, NY (US)

(73) Assignee: The Research Foundation for The State University of New York, Buffalo, NY (US)

( * ) Notice: Subject to any disclaimer, the term of this patent is extended or adjusted under 35 U.S.C. 154(b) by 0 days.

(21) Appl. No.: 15/543,752

(22) PCT Filed: Jan. 19, 2016

(86) PCT No.: PCT/US2016/013972
§ 371 (c)(1),
(2) Date: Jul. 14, 2017

(87) PCT Pub. No.: WO2016/115573
PCT Pub. Date: Jul. 21, 2016

(65) Prior Publication Data
US 2017/0370833 A1  Dec. 28, 2017

Related U.S. Application Data

(60) Provisional application No. 62/104,677, filed on Jan. 16, 2015.

(51) Int. Cl.
| | |
|---|---|
| *G01J 5/02* | (2006.01) |
| *G01N 21/3581* | (2014.01) |
| *G01N 21/03* | (2006.01) |
| *G02B 21/00* | (2006.01) |
| *G01N 21/23* | (2006.01) |
| *G01N 21/3586* | (2014.01) |

(52) U.S. Cl.
CPC ......... *G01N 21/3581* (2013.01); *G01N 21/03* (2013.01); *G01N 21/23* (2013.01);
(Continued)

(58) Field of Classification Search
CPC ........... G01N 21/3581; G01N 21/4795; G01N 21/3563; G01N 21/03; G01N 21/23;
(Continued)

(56) References Cited

U.S. PATENT DOCUMENTS

| | | | |
|---|---|---|---|
| 5,985,669 A | 11/1999 | Palander | |
| 2004/0155665 A1* | 8/2004 | Arnone | G01N 21/3581 324/644 |

(Continued)

FOREIGN PATENT DOCUMENTS

WO    2003/042670 A1    5/2003

OTHER PUBLICATIONS

Wu et al., "Free-space electro-optic sampling of terahertz beams," 1995, Applied Physics Letters, vol. 67, No. 24, pp. 3523-3525.*

(Continued)

*Primary Examiner* — Kiho Kim
(74) *Attorney, Agent, or Firm* — Hodgson Russ LLP

(57) ABSTRACT

An apparatus and method for Crystal Anisotropy Terahertz Microscopy ("CATM") is provided. The apparatus includes an emitter configured to emit a THz pulse and a detector configured to detect the THz pulse after the pulse is transmitted through a sample disposed on a sample surface of the detector. A pulsed radiation generator generates a probe beam to interrogate the detector. The detector may include an electro-optical ("EO") crystal configured to change in birefringence according to the THz pulse. The sample surface of the detector may have a dielectric coating which is transmissive to THz and reflective to the probe beam. The sample is disposed on the dielectric coating.

12 Claims, 13 Drawing Sheets

(52) U.S. Cl.
CPC ..... *G02B 21/0004* (2013.01); *G01N 21/3586* (2013.01); *G01N 2201/0683* (2013.01); *G01N 2201/06113* (2013.01)

(58) Field of Classification Search
CPC ..... G01N 21/3586; G01N 2201/06113; G01N 2201/0683; G02B 21/0004
See application file for complete search history.

(56) References Cited

U.S. PATENT DOCUMENTS

| | | | |
|---|---|---|---|
| 2005/0230625 A1 | 10/2005 | Zhang et al. | |
| 2008/0239317 A1 | 10/2008 | Schulkin et al. | |
| 2010/0219343 A1* | 9/2010 | Reid | G01N 21/23 250/341.3 |
| 2012/0008140 A1 | 1/2012 | Khan et al. | |
| 2015/0183988 A1* | 7/2015 | Becker | C08G 65/325 435/382 |

OTHER PUBLICATIONS

Wang et al., "Terahertz polarization real-time imaging based on balanced electro-optic detection," 2010, Journal of Optical Society of America A, vol. 27, No. 11, pp. 2387-2393. (Year: 2010).*
Park et al., "GaAs-based near-infrared omnidirectional reflector," 2003, Applied Physics Letters, vol. 82, No. 17, pp. 2770-2772. (Year: 2003).*

* cited by examiner

APPARATUS AND METHOD FOR ANALYZING A SAMPLE

CROSS-REFERENCE TO RELATED APPLICATIONS

This application claims priority to U.S. Provisional Application No. 62/104,677, filed on Jan. 16, 2015, the disclosure of which is incorporated herein by reference.

STATEMENT REGARDING FEDERALLY SPONSORED RESEARCH

This invention was made with government support under contract no. 53383-1-1085743 awarded by the National Science Foundation. The government has certain rights in the invention.

FIELD OF THE DISCLOSURE

The present disclosure relates to the field of terahertz spectroscopy.

BACKGROUND OF THE DISCLOSURE

Well-known biological processes rely on protein structural changes, such as neuron signal transmission and oxygen transport. The opening and closing of ion channels for signaling currents depends on the structural changes of the transmembrane protein forming the pore. In the case of hemoglobin, the oxygen-transporting protein in blood, global structural change with initial binding of oxygen in a single domain biases the structure towards binding in additional domains, increasing delivery efficiency. It has long been speculated that protein structural change critical to function is mediated through long-range vibrational motions involving dynamical networks extending throughout the protein. Drastic changes in enzyme efficiency, and electron transfer rates with mutations remote from the active site have been attributed to these long-range motions linking the mutation site with the active site. The relevance of protein intramolecular motions to function was first inferred from calculations showing that functional conformational change is replicated using only the first few lowest energy vibrational modes for a variety of systems, and reports of reaction rate control by optical overpumping. Inelastic scattering measurements have indicated these motions are present but the measurements required complex facility-based methods as well as cryogenic temperatures and/or non-physiological hydrations. The lack of measurement of these motions under physiological conditions has led to the assumption that the similarity between the calculated motions and protein functional structural change merely indicates a dynamic predisposition towards the functional intermediate states and that the motions themselves do not exist but are overdamped.

The measurement of protein long-range vibrations are challenged in part by the dense nearly featureless vibrational density of states ("VDOS"), which is peaked in the terahertz frequency range (0.03-6.0 THz, 1-200 $cm^{-1}$, 12.5 meV-25 meV). Optical measurements can reduce this complexity by selecting modes that have a strong interaction with light: that is strong dipole coupling. However, standard THz spectroscopic techniques have been unsuccessful in isolating specific modes because of a large additional glass-like background from librational motions of the solvent and peptide side chains.

BRIEF SUMMARY OF THE DISCLOSURE

An apparatus for Crystal Anisotropy Terahertz Microscopy ("CATM") is disclosed. Such an apparatus can be used to measure protein intramolecular vibrations which can potentially lead to a transformative understanding of the role of long range motions in protein function and allosteric control. The CATM technique accesses the structural vibrations by removing a strong solvent background through anisotropy measurements of the aligned molecular arrays provided by crystal structure.

CATM is based on the insight that the local motions giving rise to the background can be isolated from the collective modes through the polarization dependence. The strength of the absorption for a vibrational mode depends on the relative direction of the vibration transition dipole and the light polarization.

For a single protein molecule, the waters' and residue side chains' orientation varies throughout the protein with no preferred direction. FIG. 1 shows the ribbon diagram for HEWL along with hydration waters. As can be seen in the figure, the waters are randomly aligned over the surface of the protein. Also shown in the figure are the displacement vectors for the lowest collective mode. Light polarized along the same direction as the overall direction of the mode vectors, E∥ in the figure, can couple both to the relaxational water motion and the collective vibrational mode of the protein. If the light polarization is rotated by 90°, it will still have the same strength coupling to the water, but there will be no coupling to the HEWL collective mode. Taking the difference in absorption for the two THz polarizations will remove the water contribution, with only the collective mode absorption remaining. The illustration is for a single molecule. In order to have this polarization contrast for a macroscopic protein sample, the protein molecules are aligned. Crystals provide this alignment. Polarization difference measurements on protein crystals removes the relaxational background, isolates the collective mode response, and provides information on the direction of the vibration. However, protein crystals are typically much smaller (~200 μm) than the diffraction limited spot size at THz frequencies (~1 mm). The presently-disclosed technique overcomes this issue by using a near-field THz microscopy method referred to herein as crystal anisotropy terahertz microscopy (CATM).

Protein crystals provide a regular array of protein molecules in an environment similar to a crowded cell. They are routinely produced for X-ray and solid state NMR structural measurements and have been used extensively to characterize functional dynamics. Protein crystals contain 30-70% water, most of which is mobile. Greater than 85% of protein structures have been determined via X-ray crystallography, and the protocols for crystallization are readily available. Protein crystals typically have ~200-300 μm lateral dimensions. This poses a challenge for THz spectroscopy with a diffraction limited spot size ~1 mm. The presently-disclosed CATM addresses this challenge by using THz near field microscopy.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
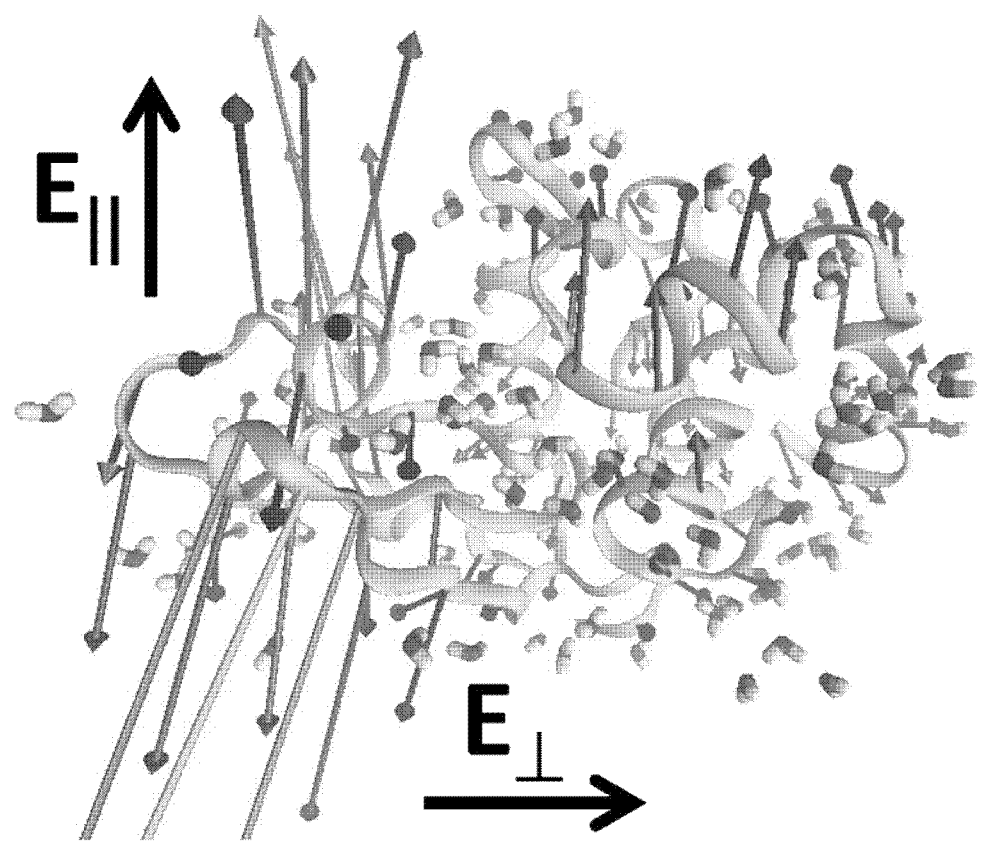
FIG. 1 is a HEWL lowest energy collective mode vector diagram, and two orthogonal probing electric field polarizations.

In an exemplary embodiment of the present disclosure, terahertz pulses are generated and detected coherently giving a time-dependent field profile E(t). The Fourier transform then gives the frequency content with amplitude and phase $E(\omega)e^{i\varphi(\omega)}$. The wavelength range is λ=50 mm. Given that typical protein crystals have dimensions ~200 µm, far-field optical measurements are challenging owing to the diffraction limited spot size for this frequency range is 500 µm. To overcome this limitation, a THz TDS near-field scanning microscope method was used. In an exemplary embodiment of the present disclosure, photoconductive THz generation and electro-optic detection are used; however, for THz near-field scanning microscope, the sample is placed directly on top of a horizontal ZnTe electro-optic detection crystal. A near-infrared probe is used to detect the THz light. This near-infrared beam is incident from the back of the electro-optic crystal and its spot size determines the image resolution. The spatial resolution of the exemplary system is 10-30 µm. The THz system is enclosed and purged with dry nitrogen to remove artifacts from gas-phase water. All measurements may be performed at room temperature.

To ensure that the protein crystal remains in a hydrated atmosphere, the ZnTe crystal forms part of a humidity-controlled chamber for the sample. The hydration in the chamber is controlled by a flow from a Licor Dewpoint generator set to 100% relative humidity.

If a protein crystal sample is placed directly on the ZnTe electro-optic crystal, the radiation detected is both that transmitted through the sample and that diffracted by sample edges. The contamination from diffraction is sufficiently large that absorption peaks can be entirely obscured. Knab et al. demonstrated that by using small apertures one can attain the same spectroscopic quality from microscopic samples in the near field as can be achieved in the far field for macroscopic samples. This method is implemented by mounting the protein crystals over a 300 µm diameter aperture in a thin aluminum plate (~150 µm thick). Different orientations are measured by rotating this sample plate. A THz image is acquired by scanning the ZnTe-sample stage and measuring a THz waveform for each pixel. For each orientation angle, a THz image is taken of the aperture to determine the center pixel positions, which will change slightly owing to the manual rotation of the sample plate. The Δabs spectra are determined from the center pixels for each orientation.

A typical transmission measurement includes measuring the transmitted field through a reference and the sample giving the field transmittance:

$$t(\omega) = \frac{E_{sample}(\omega)e^{i\varphi sample(\omega)}}{E_{ref}(\omega)e^{i\varphi ref(\omega)}} = f(\omega)e^{-\alpha(\omega)d/2}e^{i\omega(n(\omega)-1)d/c} \quad (1)$$

where f(ω) is the loss from Fresnel reflection, α(ω) is the absorption coefficient, c is the speed of light, n(ω) is the refractive index and d is the sample thickness. Challenges in determining the frequency-dependent absorbance in the THz region include proper referencing and removal of multiple reflection interference effects, often referred to as the Fabry-Perot etalon.

Both the referencing and etalon concerns are addressed by self referencing. Because the interest is in the change in absorbance with orientation, a single orientation of the crystal is used as a reference, and a difference absorbance is calculated using the following:

$$\Delta abs = -2\ln\left[\frac{|E_t(\omega, \theta)|}{|E_t(\omega, \theta_{ref})|}\right] \quad (2)$$

$$= -2\ln\frac{F(\omega)|E_i(\omega)|e^{-\alpha(\omega,\theta)d/2}}{F(\omega)|E_i(\omega)|e^{-\alpha(\omega,\theta_{ref})d/2}}$$

$$= [\alpha(\omega, \theta) - \alpha(\omega, \theta_{ref})]d$$

where $|E_t(\omega, \theta)|$ ($|E_i(\omega, \theta)|$) is the magnitude of the transmitted (incident) electric field, α(ω, θ) is the sample's absorption coefficient at frequency ω, orientation angle θ, and d is the sample thickness. F(ω) is the frequency-dependent transmission due to Fresnel loss at interfaces, subwavelength aperture effects and etalon. This factor should be orientation independent. By using the center pixels of the aperture at a given orientation, the thickness of the sample is always the same, even for a faceted crystal; thus, the removal of etalon should be valid as long as there is no strong birefringence.

Figure 12A:
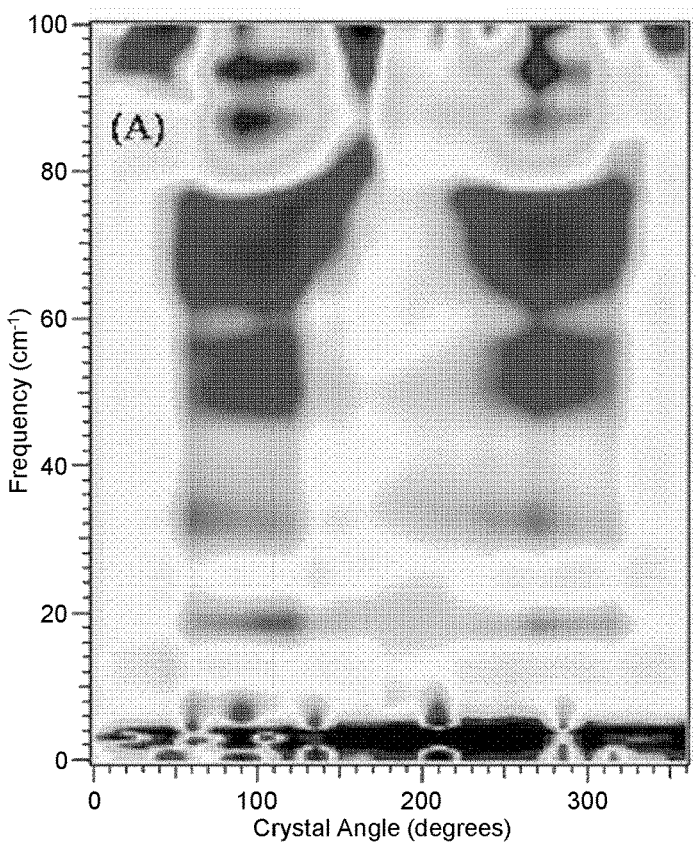
FIG. 12A is a chart depicting Δabs measurements show 180° symmetry features at 45 cm$^{-1}$, 69 cm$^{-1}$, and 78 cm$^{-1}$.
Figure 12B:
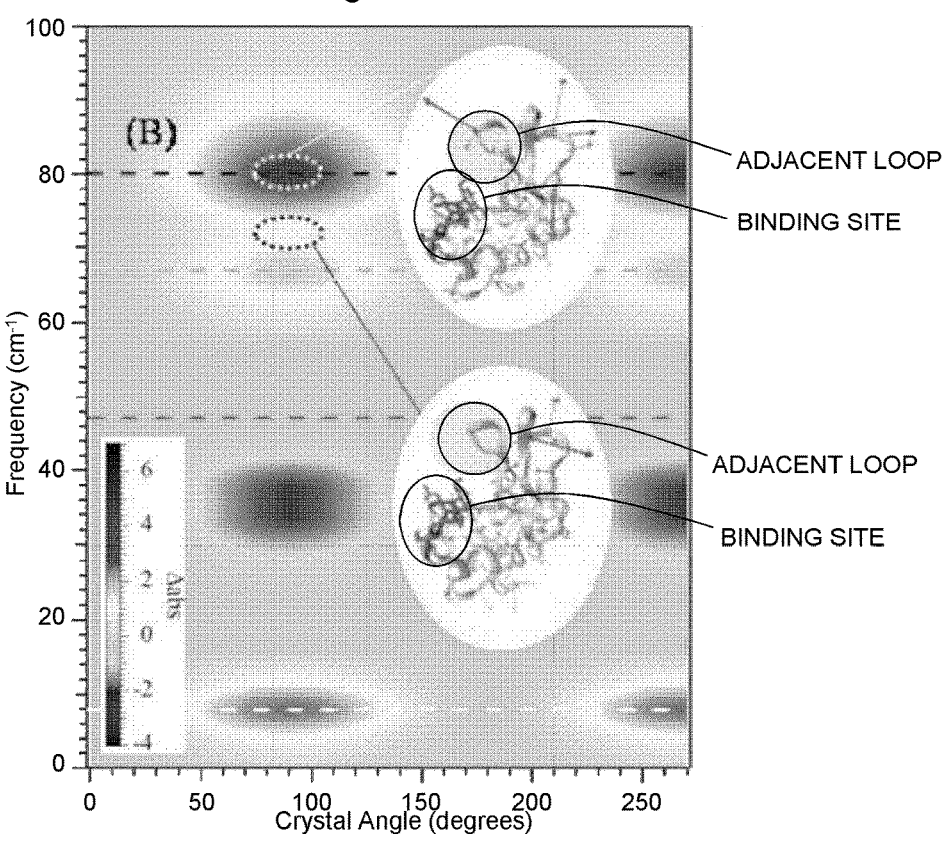
FIG. 12B is a chart showing the calculated Δabs from NMA.
Figure 12C:
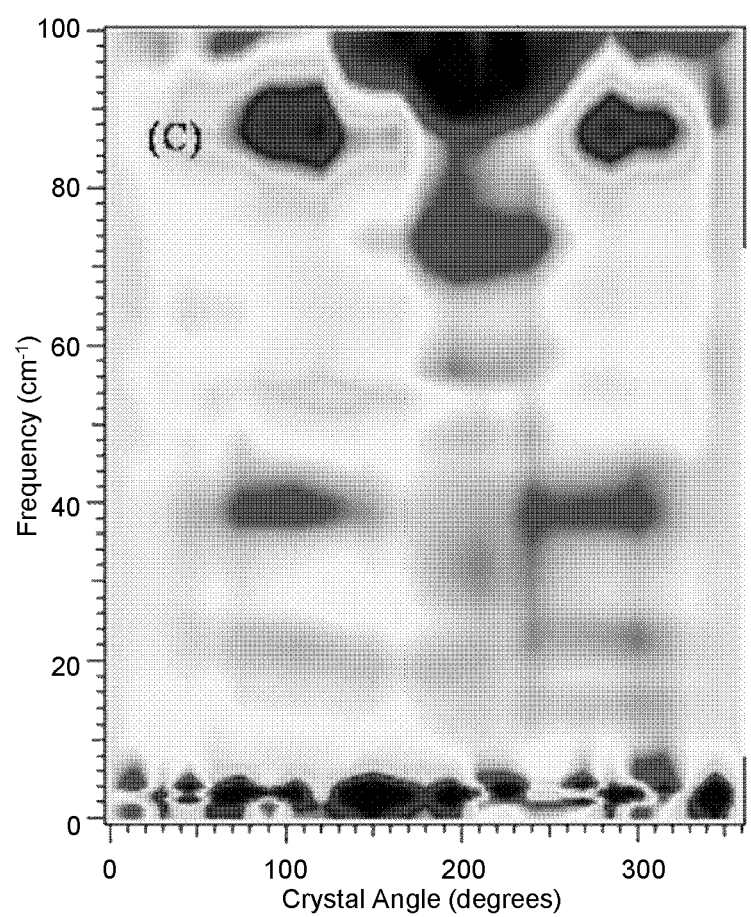
FIG. 12C is a chart showing the dramatic change in the intramolecular vibrations with inhibitor binding.
Figure 13A:
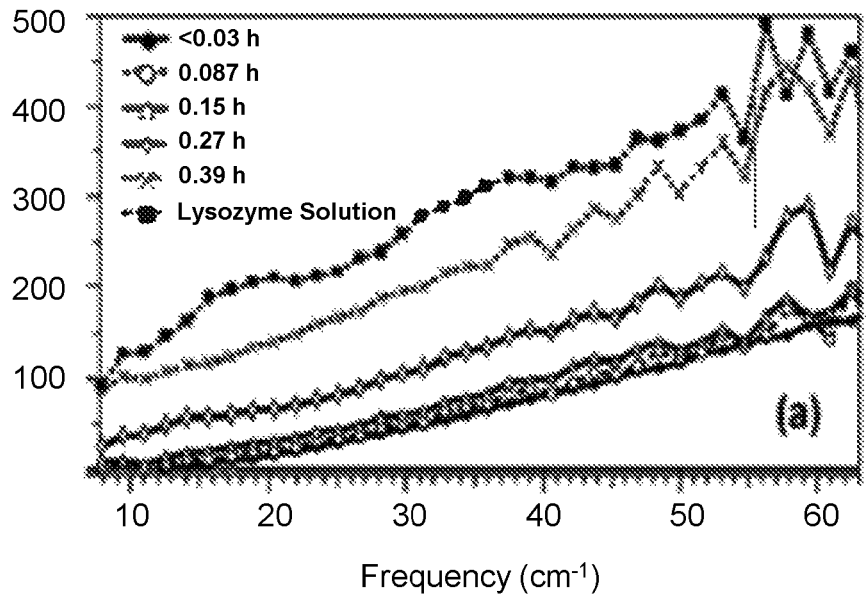
FIG. 13A is a graph of conventional transmission measurement of HEWL solution and hydrated films.
Figure 13B:
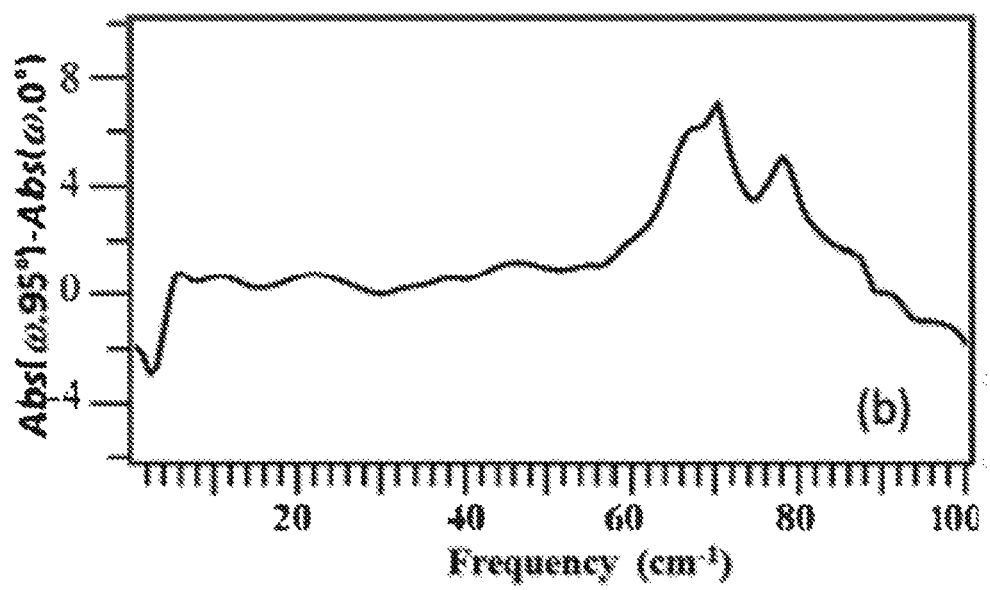
FIG. 13B is a graph of CATM measurement of an HEWL crystal.

FIG. 12A shows results for the (110) face of a CEWL tetragonal crystal using an exemplary embodiment of the CATM apparatus. The modes contributing to the spectrum must have a net dipole derivative, and therefore the net atomic displacements in the (110) face of the crystal. The anisotropy signal for a protein crystal immediately indicates the direction of the vibrational displacements. FIG. 12B shows NMA calculations of the CATM spectrum with displacement vectors diagrams for a vibration at resonant peak at 80 cm$^{-1}$ and one where there is no CATM signal at 72 cm$^{-1}$. The molecules are depicted as they are oriented for the (110) face. The inhibitor binding site is generally illustrated as the portion labeled "Binding Site" in 12B. The THz field lies in the plane, and thus more strongly couples to the 80 cm$^{-1}$ mode than the 72 cm$^{-1}$ mode. Further the 80 cm$^{-1}$ mode includes motion of the loop adjacent to the binding site (see circle labeled "Adjacent Loop" in 12B). If the inhibitor is bound, displacements into the binding region would be more limited and the 80 cm$^{-1}$ mode would be affected. This is indeed the case as seen in FIG. 12C which shows the CATM measurements for CEWL bound to the inhibitor tri-acetylglucosamine (3 NAG). CATM both measures protein intramolecular vibrations, and it reveals that the intramolecular vibrational spectrum dramatically changes with binding. The large shift for small ligand binding confirms that the resonances arise from intramolecular motions and not crystal lattice phonons, as the inhibitor binding should have little effect on phonons. The ability to study the intramolecular vibrations at room temperature and under full hydration is entirely new. The impact of CATM to resolve the intramolecular vibrations is emphasized in FIGS. 13A-13B. FIG. 13A shows a standard featureless absorption measurement for solution phase CEWL and hydrated CEWL films. FIG. 13B shows a CATM measurement for a tetragonal CEWL crystal with distinct vibrational resonances.

Because the anisotropic response of the crystal is being measured, the linear polarization of the THz light is preserved for the measurement. It was found that the polarization remains linear and the spectral content does not change for the central pixels of the aperture, and only at the edges of the aperture does one observe the field lines bending to the normal of the circular metal aperture and deviation from the frequency content at the center pixels. In the case of the dehydrated crystal, the magnitude of the transmission spectra was scaled by a constant frequency-independent factor to account for possible inhomogeneities in the ZnTe crystal or system drift between rotations. It was subsequently determined that this scaling was not necessary, and was not performed for the hydrated crystal data. This overall measurement technique with self referencing, is referred to as CATM.

Figure 2:
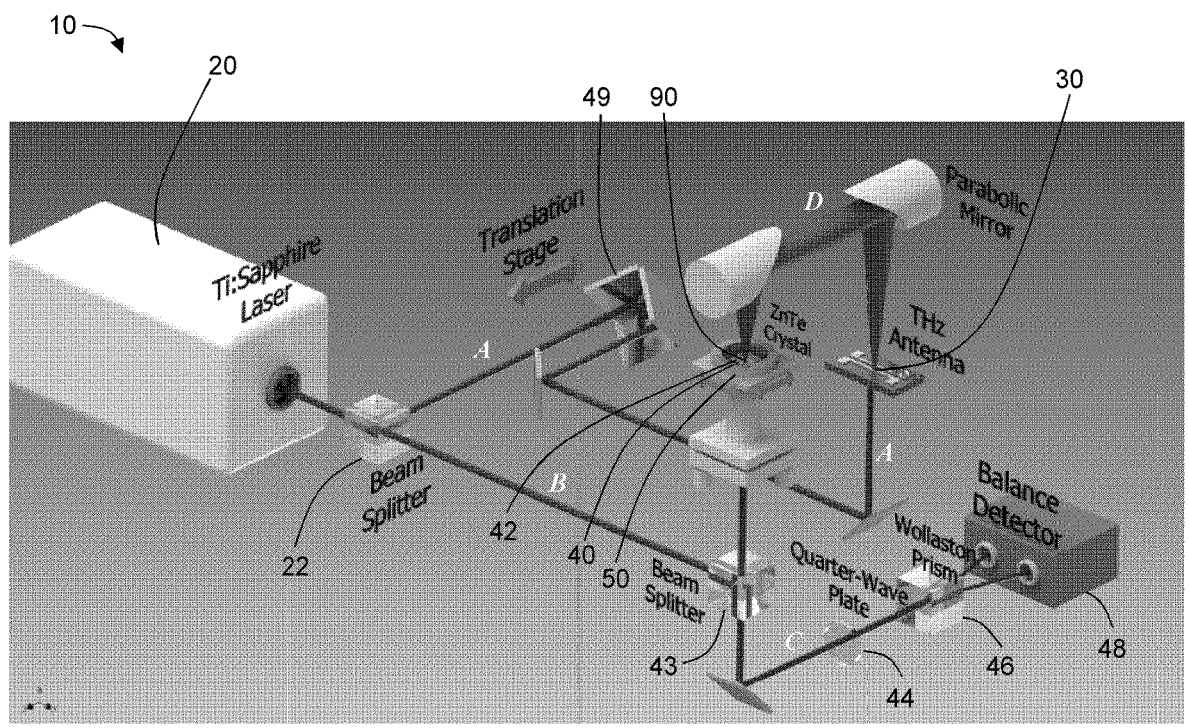
FIG. 2 is a diagram of an apparatus according to an embodiment of the present disclosure wherein some components have been hidden for clarity.

With reference to FIG. 2, an apparatus 10 for CATM according to an embodiment of the present disclosure comprises an emitter 30 for generating THz pulses. The emitter 30 may be configured to receive an excitation pulse and emit a THz pulse. The emitter 30 may use linear methods (for example, a photoconductive antenna (PCA), etc.) or non-linear methods (for example, electro-optic (EO) rectification, filament generation, UV, etc.)

The apparatus 10 further comprises a pulsed radiation generator 20. Such a pulsed radiation generator 20 may be, for example, a laser capable of generating an optical beam to produce/detect THz waves, such as a titanium-sapphire (Ti: Sapphire) laser. A suitable laser may be configured to generate a beam in the near-infrared, infrared, visible light regions of the spectrum. For example, the laser may generate a beam having a wavelength in the range of 300 nm to 10 µm, inclusive. The generator 20 is capable of providing sufficient power. For example, the generator may be capable of generating more than 10 mW of power. In a particular example, the generator 20 is capable of providing 300 mW of power.

More than one generator 20 may be used. For example, a first generator 20 may be used to generate a beam (i.e., a pump beam) to excite the emitter 30 for producing a THz pulse and a second generator 20 may be used to generate a beam (i.e., a probe beam) to interrogate a detector and detect a THz pulse. In other embodiments, a single generator 20 is used in combination with a beam splitter 22 such that the generated beam is split into a pump beam A and a probe beam B.

The apparatus 10 further comprises a detector 40 configured to detect the THz pulse after the pulse is transmitted through a sample 90. In some embodiments, the sample is a protein crystal. Such a detector 40 may use electro-optical (EO) sampling. For example, the detector 40 may be a ZnTe crystal 42. Other suitable detectors are known in the art, such as, for example, a GaP crystal. Such an EO detector 40 makes use of the Pockels effect to measure the change in birefringence of the crystal caused by the THz field. A dielectric coating on the top surface (i.e., sample side) of the EO crystal 42 has a high transmission for THz and high reflection at the wavelength of the generator, for example, high reflection at near infrared ("NIR"). The NIR reflected at the top surface of the EO crystal 42 probes the birefringence induced by the transmitted THz. Because the detection occurs at a distance considerably less than the THz wavelength from the sample 90, the measurement is in the near field, with resolution nearly equal to the NIR waist, that is a resolution of $<\lambda_{THz}/100$. The spatial resolution is ~10-20 µm.

The probe beam B is used to interrogate the optical properties of the crystal 42 by passing through the crystal 42 before being reflected back (reflected probe beam C) by the top surface of the crystal 42. The THz pulse D from the emitter 30 passes through the sample 90 from "above" and co-propagates through the crystal 42 with the reflected probe beam C. The THz pulse causes a change in the birefringence of the crystal 42. This change in birefringence causes a change in the polarization of the reflected probe beam C. The change in polarization of the reflected probe beam C is then measured to determine the THz field. For example, the reflected probe beam C may be split from the probe beam B by beam splitter 43 and then directed through a quarter-wave plate (QWP) 44 to change the ellipticity of the beam, and a Wollaston prism 46 to separate the perpendicular components of the elliptical polarization such that the components can be separately measured by photodiodes of a polarization detector 48 such as, for example a balanced detector. In this way, the change in polarization of the reflected probe beam may be determined, which change is dependent on the amplitude of the electric field of the THz pulse.

A time delay is provided to alter the timing of the THz pulse with respect to the probe beam A. This time delay may be an optical delay, for example, a translation stage 49 to change the length of the path of the pump beam B. This enables interrogation of the entire THz pulse by varying the arrival time of the probe pulse.

Figure 3:
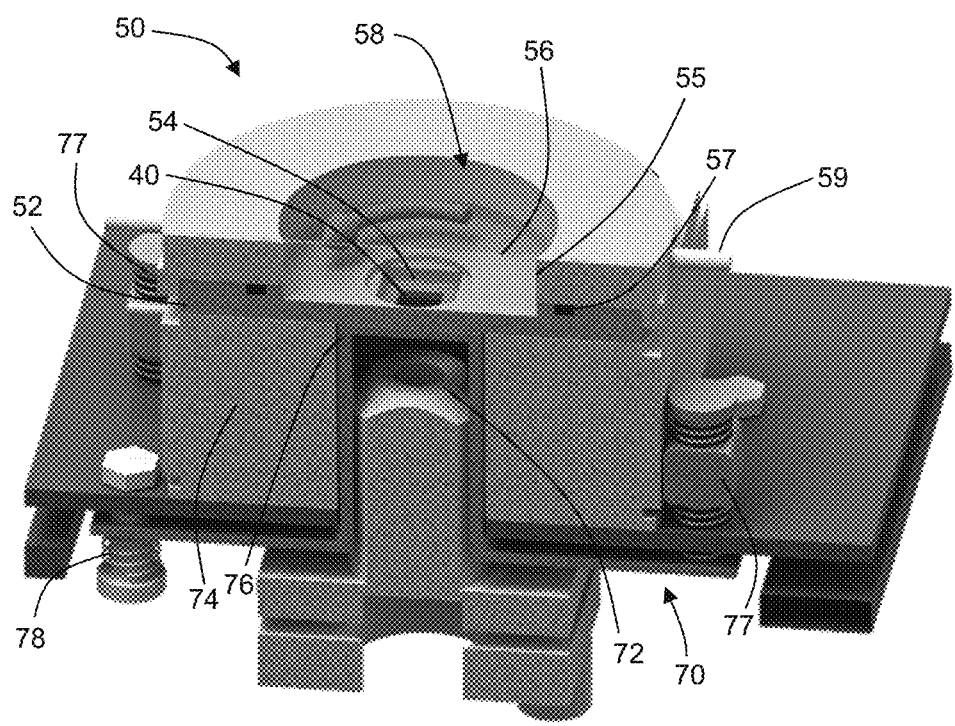
FIG. 3 is a cross-section of a hydration cell and a mount according to an embodiment of the present disclosure.

The optical system is purged with dry nitrogen or dry air to remove atmospheric water absorption. The sample 90 is held in a hydration cell 50 (see, e.g., FIG. 3). The hydration cell 50 comprises a base plate 52 having an opening 54 through which the EO crystal 42 is accessible. The cell 50 further comprises one or more walls 55 and a window 56, arranged to create, with the base plate 52, an enclosed chamber 58 for containing the sample 90 (not shown in FIG. 3 for clarity). The window 56 is made from a material that is transparent to THz signals. The cell 50 further includes at least one port 59 in pneumatic communication with the chamber 58. The port 59 may be configured to be connected to a hydrated air source in order to maintain a desired humidity within the chamber 58. The desired humidity is selectable dependent on the requirements of the sample 90. For example, the humidity of the chamber 58 may be greater than 80%.

Figure 4A:
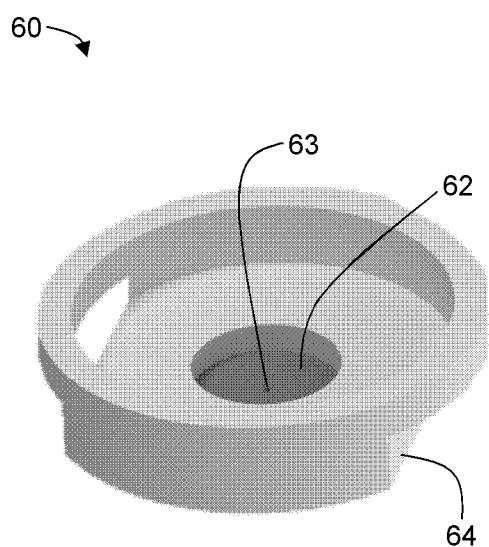
FIG. 4A is a diagram of an embodiment of a sample cup according to the present disclosure.
Figure 4B:
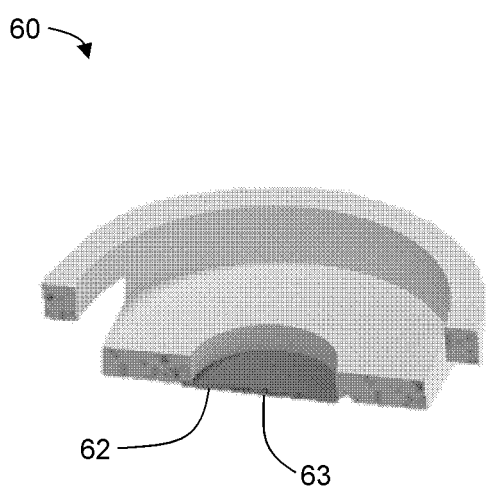
FIG. 4B is a cross-section of the sample cup of FIG. 3A.

The hydration cell 50 may further comprise a removable sample cup 60 for more convenient placement of the sample 90 at a position in close proximity to the detector 40 (see, e.g., FIGS. 4A and 4B). The sample cup 60 has a sample plate 62 with an aperture 63. The aperture 63 has a diameter which is less than the smallest planar dimension of the sample 90. For example, the aperture 63 may have a diameter of 200-300 µm. In this way, the sample 90 is positioned on the sample plate 62 at the aperture 63, and the sample plate is placed on the detector 40 for measurement. The sample plate 62 may have alignment marks for indexing the position of the sample 90. The sample cup 60 may be configured for registration with the base plate 52 of the cell 50 such that the sample cup 60 can only be inserted in a limited number of orientations (relative to the cell 50). For example, the sample cup 60 may have a square periphery 64 to engage with a square opening 54 of the base plate 52.

The apparatus 10 may further comprise a mount 70 for retention of the hydration cell 50 at a location above the detector 40 and an objective lens 72 of the apparatus 10. The mount 70 may comprise a holder 74 configured to encircle the objective lens 72 and on which the cell 50 can be disposed. The holder 74 is configured to retain the objective lens 72 at a position proximate to the bottom surface of the detector 40, while allowing some movement of the objective lens 72 with respect to the sample 90 for centering the aperture 63 within the THz beam D. The holder 74 is able to translate in the x-y direction (typically under computer control) in order to center the aperture 63.

In some embodiments of the present apparatus 10, the base plate 52 of the cell 50 is configured to rotate. As such, the sample 90 can be rotated relative to the polarization of the THz pulse D for additional measurement. In such embodiments, the cell 50 may further comprise a gasket 57 between the base plate 52 and the one or more walls 55. In this way, the base plate 52 may be rotated relative to the one or more walls 55 without losing the integrity (and thus, the humidity) of the chamber 58 during rotation and without rotation of the at least one port 59. In embodiments of the presently disclosed apparatus 10 where the base plate 52 is rotatable, the mount 70 may further comprise a stage 76 on which the detector 40 is mounted. One or more actuators 77 are provided to cause the holder 74 and the stage 76 to separate (i.e., translate with respect to one another). In this way, the stage 76 and the detector 40 are configured to lower in order to remove the sample plate 62 from contact with the detector 40. When the base plate 52 is rotated, the stage 76 may first be lowered such that the sample plate 62 not contact the detector 40 during rotation. The stage 76 and/or the holder 74 are biased such that they return to a measurement position (where the sample plate 62 contacts the detector 40) when the actuators 77 are inactive. For example, a spring 78 may cause such a return to the measurement position.

Figure 5:
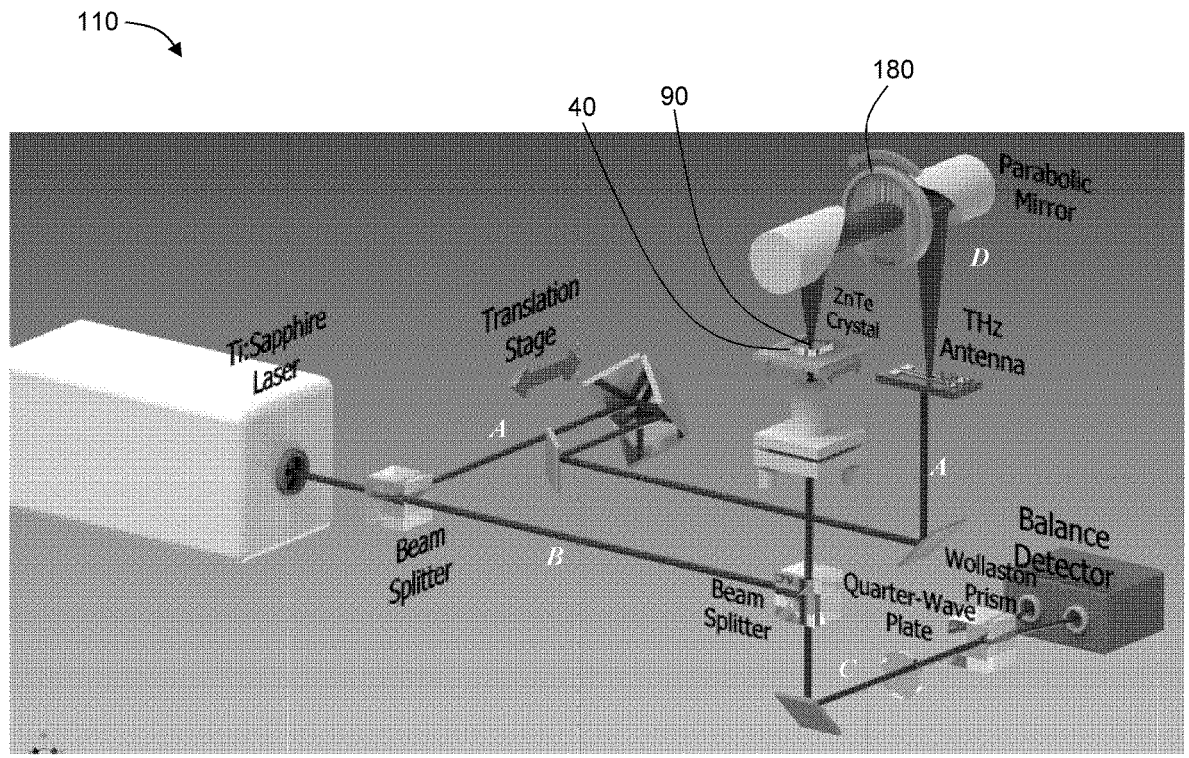
FIG. 5 is a diagram of an apparatus according to another embodiment of the present disclosure wherein some components have been hidden for clarity.

In another embodiment of an apparatus 110 of the present disclosure (depicted in FIG. 5), the sample 90 is not rotated and a rotatable polarizer 180 (e.g., a wire grid polarizer, etc.) is disposed in the path of the THz pulse D to rotate the polarization of the THz pulse D relative to the sample 90. Such an arrangement allows for significant reduction in time and error compared to embodiments wherein the sample 90 is manually rotated or removed from contact with the detector 40 during rotation. In embodiments requiring rotation of the sample, rotation of the sample plate causes the aperture 63 to move slightly (never perfectly on the rotation axis) relative to the optical system, necessitating a scan to find the center of the aperture 63 after each rotation. In embodiments where a polarizer is rotated, not the sample 90, the aperture 63 never moves with respect to the optical system so identification of its center is only necessary prior to the first detection event.

Use of a linear polarizer as polarizer 180 can cause changes in amplitude of the resulting THz signal at different rotational orientations of the polarizer 180. In other embodiments, such as that depicted in FIG. 6, this variation in amplitude is addressed by converting the linearly polarized THz to be circularly polarized. A broadband waveplate (FIG. 7) based on total internal reflection within a high purity silicon prism may be used. The prism is aligned relative to the incident THz beam. This is further described below.

Figure 6:
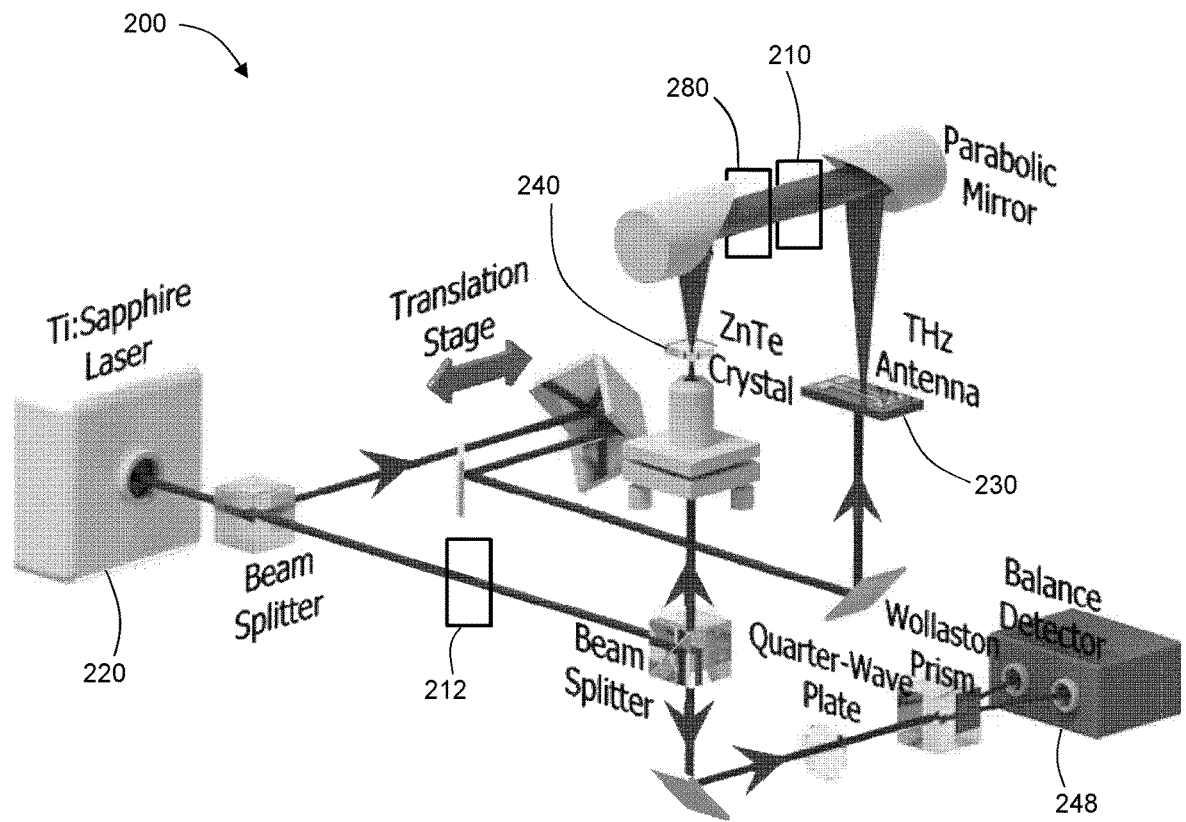
FIG. 6 is a diagram of an apparatus according to another embodiment of the present disclosure wherein some components have been hidden for clarity.
Figure 8:
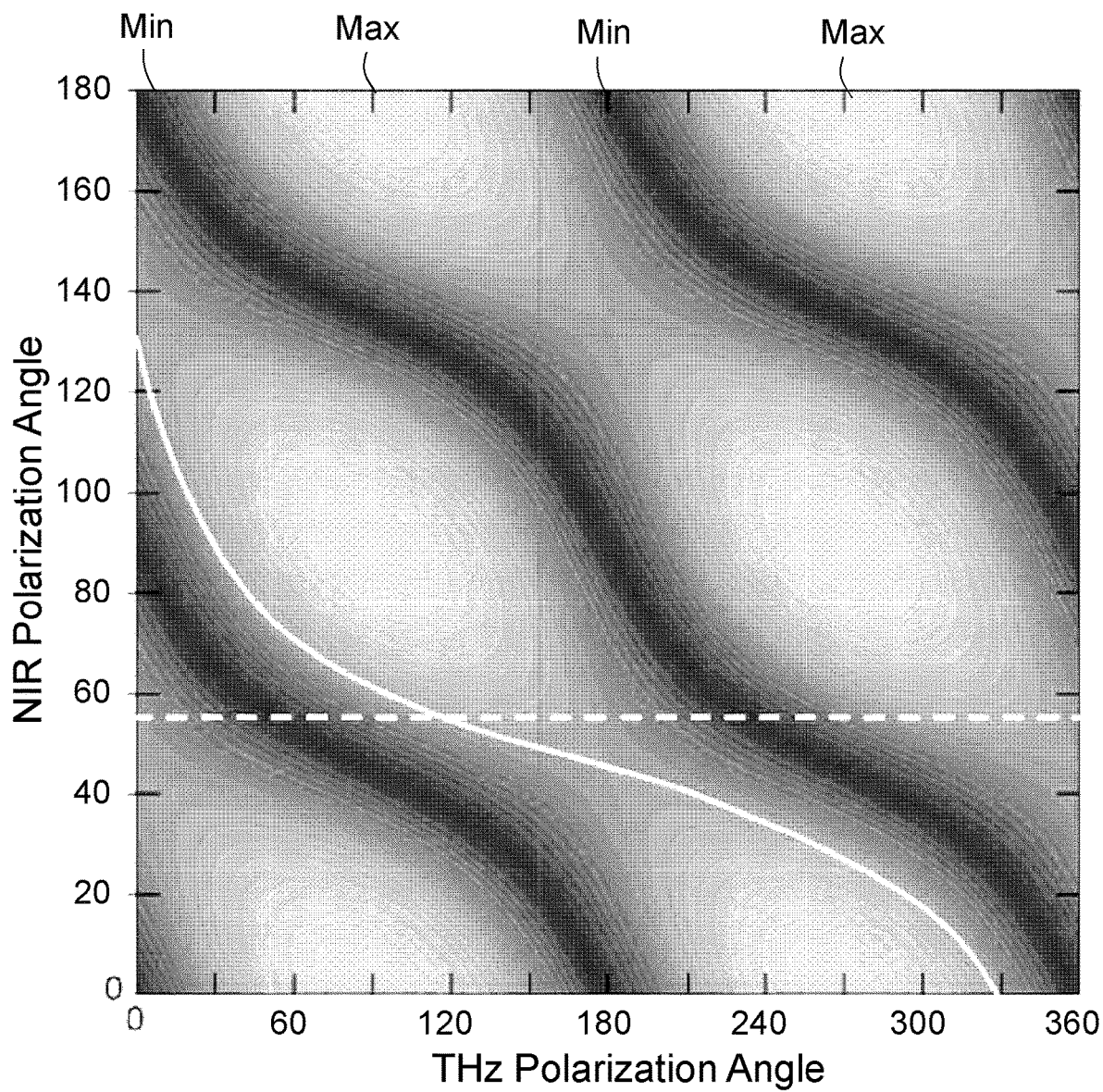
FIG. 8 is a plot showing EO detector sensitivity versus polarization angles relative to ZnTe.

In another embodiment of an apparatus 200 using a rotatable polarizer 280 shown in FIG. 6, the probe beam polarization is varied in concert with the THz beam to avoid a change in detector 240 sensitivity. FIG. 8 shows an exemplary surface plot of the EO signal as a function of THz and NIR (probe) polarization relative to the (001) axis of the (110) cut ZnTe crystal. The straight dashed line shows the angle of the NIR radiation used for a set of measurements. The detector sensitivity goes to zero at THz angles 75 and 245 for this NIR orientation. These zero signal regions can be filled in by measuring PV-CATM for two different NIR polarizations. The measured signal could then be adjusted according to the detector sensitivity change with THz polarization. Such post measurement compensation can be avoided by ensuring the detector sensitivity is constant for the entire THz polarization variation. This can be achieved by changing the NIR polarization in concert with the THz. An example is shown by the solid curved line, showing the function dependence of the NIR polarization on the THz polarization for the response to remain constant. The particular interdependence shown allows the THz polarization variation in the 30-330 degree range.

As such, the apparatus 200 includes a polarizer 280 disposed in a path of the THz pulse between the emitter 230 and the sample. The polarizer 280 is configured to polarize the THz pulse and is rotatable. A quarter-wave plate 210 is disposed in a path of the THz pulse between the emitter 230 and the polarizer 280. A half-wave plate 212 is disposed in the path of the probe beam before the polarization detector 248. The half-wave plate 212 is configured to be rotated as a function of a rotation of the polarizer 280.

Rotating the THz polarization would avoid the sample plate displacement. Polarization rotation by transmission through a linear polarizer will have large field amplitude variation because the generated THz is linearly polarized. In an embodiment, the source is rotated. However, the electrical connections to the antenna generator, as well as beam deviation with antenna rotation are difficult with this approach. In another embodiment, amplitude change with polarization rotation is prevented by converting the linearly polarized THz to circular polarization. For example, a broadband λ/4 (BB λ/4) wave plate based on total internal reflection within a high purity silicon prism can be used.

For a dielectric (index n)/air interface at incident angles $\theta_i$ greater than the total internal reflection critical angle, there is a phase shift $\Delta\varphi$ between and S and P polarized light that is related to the angle of incidence by:

$$\theta_i = \sin^{-1}\left[\sqrt{\frac{(n^2+1) + \sqrt{(n^2+1)^2 - 4n^2\sec^2(\Delta\varphi/2)}}{2n^2\sec^2(\Delta\varphi/2)}}\right] \quad (3)$$

Figure 7:
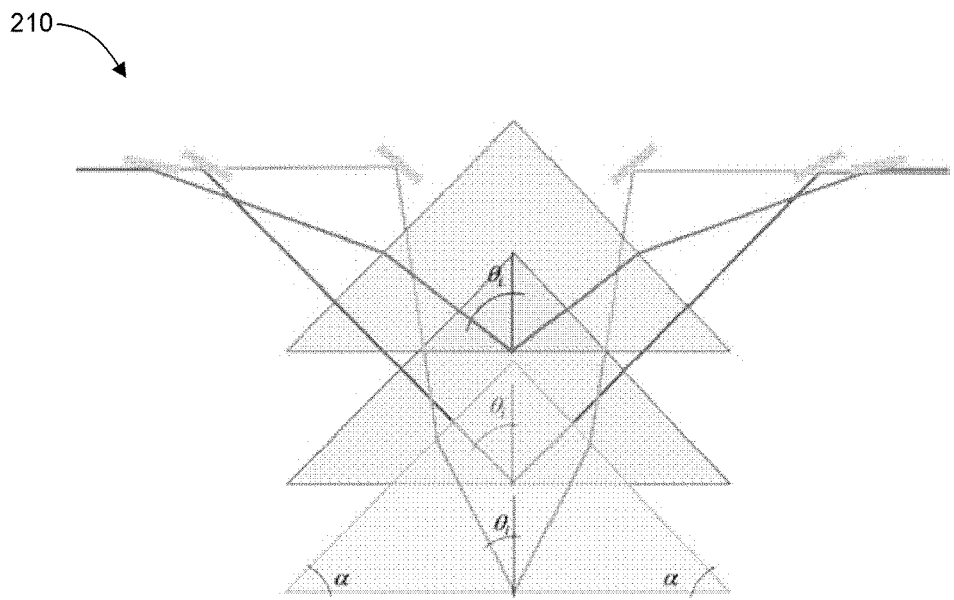
FIG. 7 is a schematic of a broadband THz quarter-wave plate assembly.

The only frequency dependence for the phase shift is from the refractive index n. High purity silicon has essentially no dispersion and no absorption in the THz range. A high purity silicon prism used in the central configuration shown in FIG. 7 will act as a broadband quarter wave plate for 50% S and 50% P incident light and prism angle α=42°. To align this configuration an IR alignment laser at 3 μm with the Si prism directly. The incident polarization will be tuned by rotation of the generating antenna, which is feasible for up to 90° without interfering with electrical contacts. A pitfall is that the input polarization will not be entirely linearly polarized because of phase shifts introduced by other optics. If this occurs, it can be addressed by tuning the incident angle on the prism face, which will tune the $\theta_i$ in Eq. 3, as illustrated by the different mirror configurations in FIG. 7. The assembly in FIG. 7 is designed to be inserted into a collimated section of any THz system. The maximum beam diameter allowance is 5 mm. If there is no collimated section that meets this maximum beam diameter, a telescope can be added to the entrance using TPX lenses. Because the EO signal is dependent on the incident THz polarization, a static THz polarizer can be used to ensure that the incident polarization on the EO crystal is constant and a second polarizer can be rotated.

Ideally the detector is insensitive to the THz polarization, such as a pyroelectric or bolometer detector. However, the power and/or cryogen requirements of these detectors can put them out of reach for room temperature near field THz measurements. Gated EO detection makes near field THz microscopy practical, but it can also present a challenge to polarization control. The EO signal is dependent on the relative orientations of the EO crystal, the NIR polarization, and the THz polarization. This dependence is given by:

$$\text{Sig}_{EO}(\theta,\varphi) \sim E_{THz}[\cos(\theta)\sin(2\varphi) + 2\sin(\theta)\cos(2\varphi)] \quad (4)$$

where $E_{THz}$ is the THz field amplitude, $\theta(\varphi)$ is the THz (NIR) polarization angle relative to the (001) axis of the (110) cut ZnTe crystal respectively. This dependence is not due the THz amplitude changing with rotation of a polarizer. Eq. 4 assumes that the THz field amplitude is constant as the polarization direction changes. Rather it is a result of the relationship of the nonlinear optical response of the Zn Te crystal. FIG. 8 shows a surface plot of Eq. 4. If the NIR polarization is held constant, as indicated by the straight dashed line, the EO response varies from a maximum value to zero as the THz polarization is rotated. To attain EO detection that is insensitive to the THz polarization, the NIR polarization can be rotated in concert with the THz. The solid curved white line in FIG. 8 shows the dependence of the NIR polarization on the THz polarization for constant response. The particular interdependence shown allows the THz polarization variation in the 0-330° range.

Figure 9:
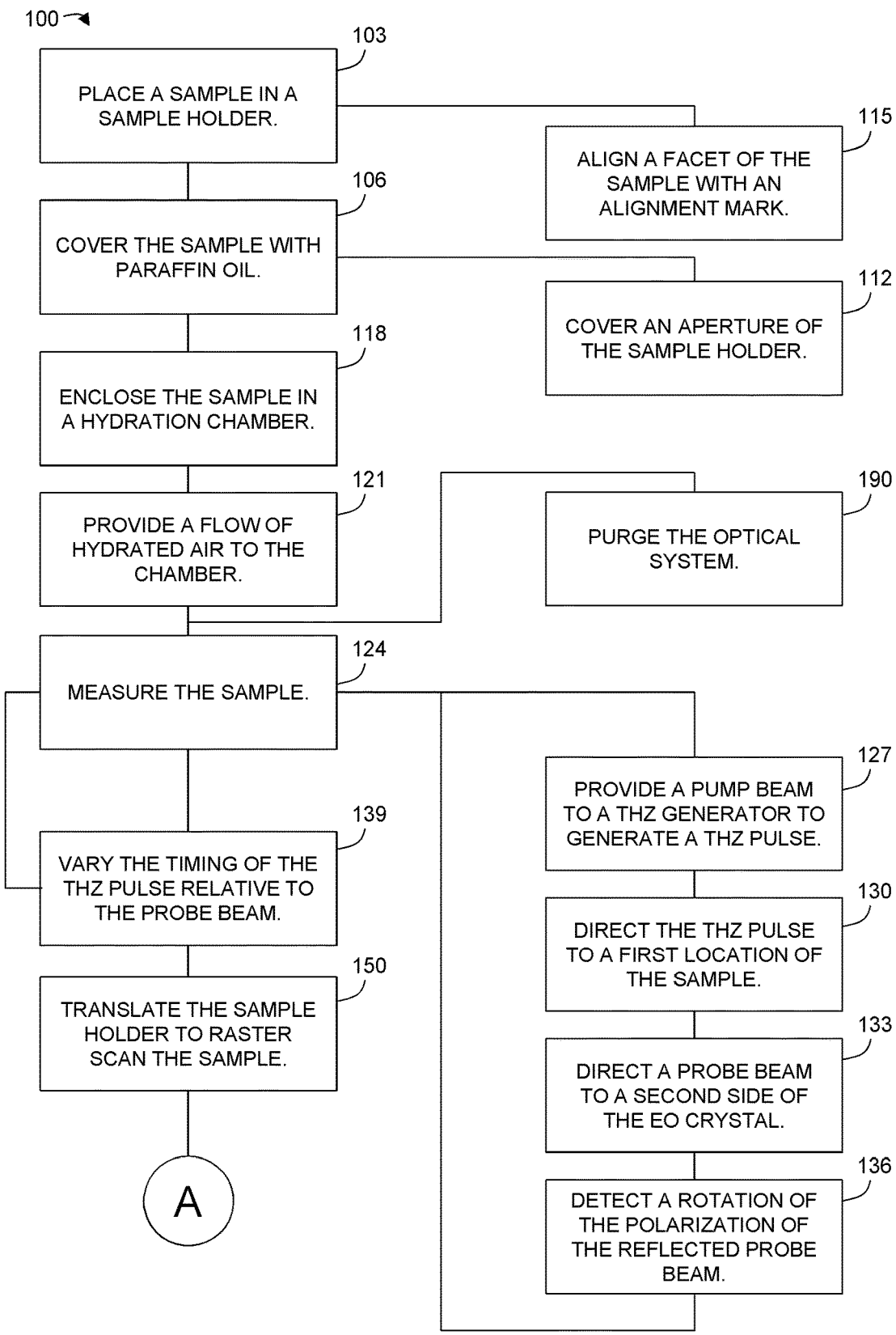
FIG. 9 is a chart depicting a method according to an embodiment of the present disclosure.
Figure 10:
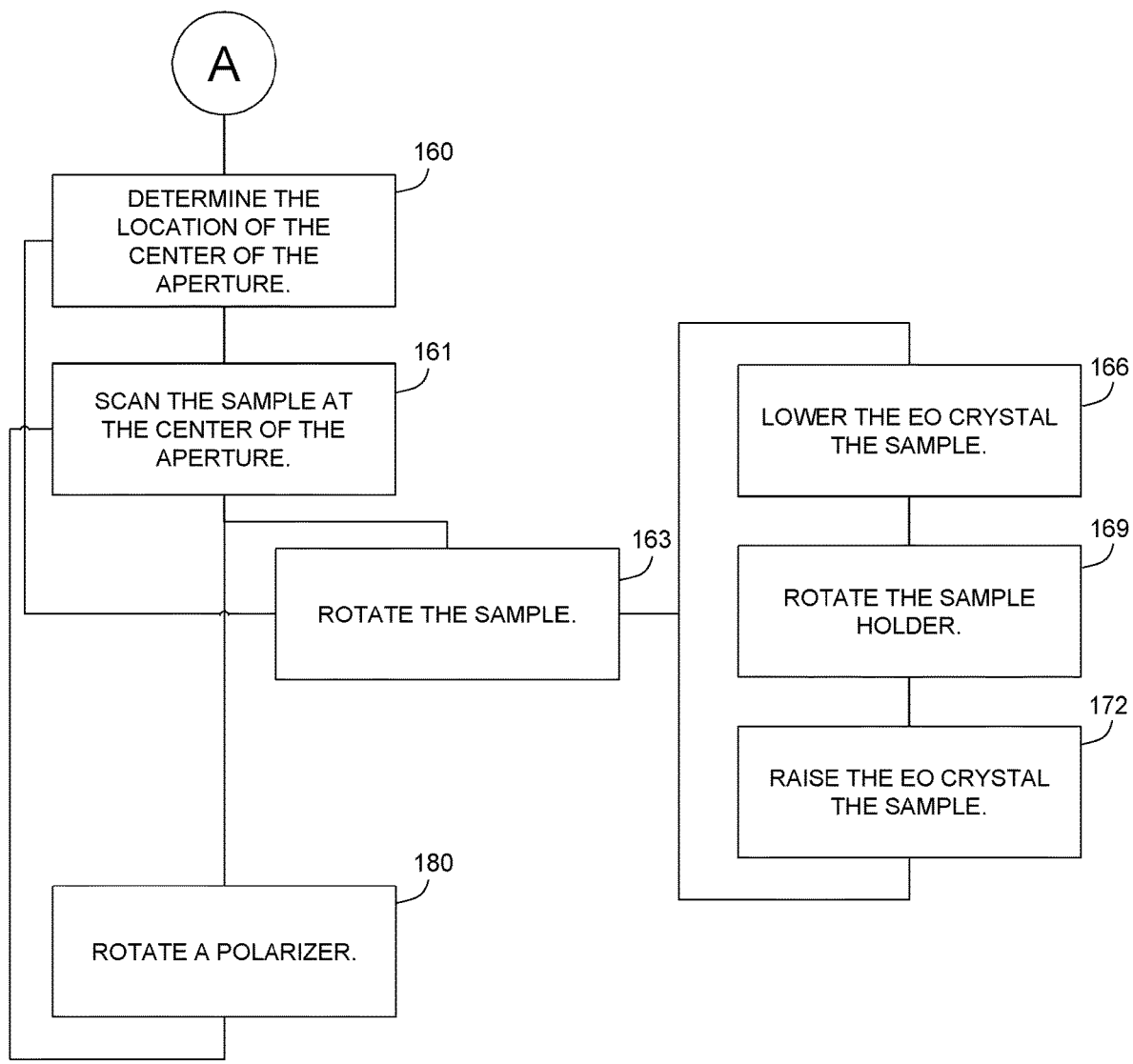
FIG. 10 is a chart depicting a method according to another embodiment of the present disclosure.

With reference to FIGS. 9 and 10, the present disclosure may be embodied as a method 100 for CATM of a sample, such as a protein crystal. A sample is placed 103 on an aperture of a sample holder. A facet of the sample may be aligned 115 with an alignment mark of the sample holder. An amount of paraffin oil may be used to cover 106 the sample in the sample holder in order to maintain hydration of the sample. The thickness of the paraffin coating is <10 μm and has negligible THz absorbance In this case, a thin layer of transparent material, such as, for example, polypropylene, poly vinyl chloride or polyvinylidene chloride, may be used to cover 112 the aperture, thereby containing the paraffin oil.

The sample is then enclosed 118 in a hydration chamber. In some embodiments, the sample holder may form a portion of the hydration chamber. In other embodiments, the sample holder may be contained within the hydration chamber. A flow of hydrated air is provided 121 to the hydration chamber.

The sample is placed into close proximity with a first surface of an EO crystal detector, the first surface having a dielectric coating as described above. The sample is then measured 124 as follows. A pump beam is provided 127 to a THz generator (e.g., a THz antenna) to generate a THz pulse. The THz pulse is directed 130 to a first location of the sample (and within the aperture). A probe beam is directed 133 to a second side of the EO crystal, reflecting off of the dielectric coating of the first side, and co-propagating back through the EO crystal at the same time as a portion of the THz pulse. The pulse beam and probe beam may be generated by a single source and split using a beam splitter. It should be noted that the probe beam typically has a shorter duration than the THz pulse. The rotation of the polarization is detected 136 such that the THz reflected probe beam (and thus the interrogated THz pulse) can be characterized. In an exemplary embodiment, the reflected probe beam is directed through a quarter-wave plate in order to circularly polarize the beam, and the beam is directed through a Wollaston prism in order to split the perpendicular components of the polarized beam. Each component beam is then directed to a corresponding photodiode of a balance detector so that the intensity of each component beam can be characterized. Other techniques to detect the rotation can be used as will be apparent to a person of skill in the art in light of the present disclosure.

The timing of the THz pulse is varied 139 with respect to the probe beam. For example, a translation stage may be moved such that the THz signal is delayed (or the delay reduced) with respect to the probe pulse. The measurement 124 is then repeated with the varied 139 timing. In this way, the probe pulse co-propagates with the THz pulse at a different time of the THz pulse to characterize this portion of the THz pulse. As such, the measurement 124 can be repeated to interrogate the majority (or entirety) of the THz pulse.

In embodiments where an area of the sample is to be measured, the sample holder is translated 150 on a plane which is perpendicular to the THz and probe beams. In this way, the sample may be raster scanned.

In some embodiments of the method 100, the aperture area may be raster scanned at a low resolution to determine 160 the location of the center of the aperture. Once determined 160, the sample at the center of the aperture is measured 161 as above at a high signal-to-noise ratio.

In some embodiments, the sample is then rotated 163. For example, the EO crystal is lowered 166 so as not to be in contact with the sample holder, the sample holder is rotated 169 about the axis of the THz and probe pulse beams, and the EO crystal is raised 172 into contact with the sample holder. In such embodiments of the method 100, the aperture is re-scanned 175 (as described above) to determine the center of the aperture. The sample at the center of the aperture is measured 161 at a high signal-to-noise ratio at the new orientation. This scan and rotate process is repeated as needed to scan the sample at each desired orientation relative to the polarization of the THz beam.

In other embodiments, rather than rotation the sample, a polarizer is rotated 180 to rotate the polarization of the THz beam with respect to the sample. The polarizer is disposed in the path of the THz beam at a location between the THz generator and the sample. In this way, the sample holder is not moved and the aperture does not need to be re-centered before each scan of the THz pulse.

The method 100 may include the step of purging 190 the optical system with dry nitrogen, or dry air, to remove atmospheric water absorption. The sample, however, is not exposed to the dry nitrogen due to the controlled hydration of the hydration cell.

Figure 11:
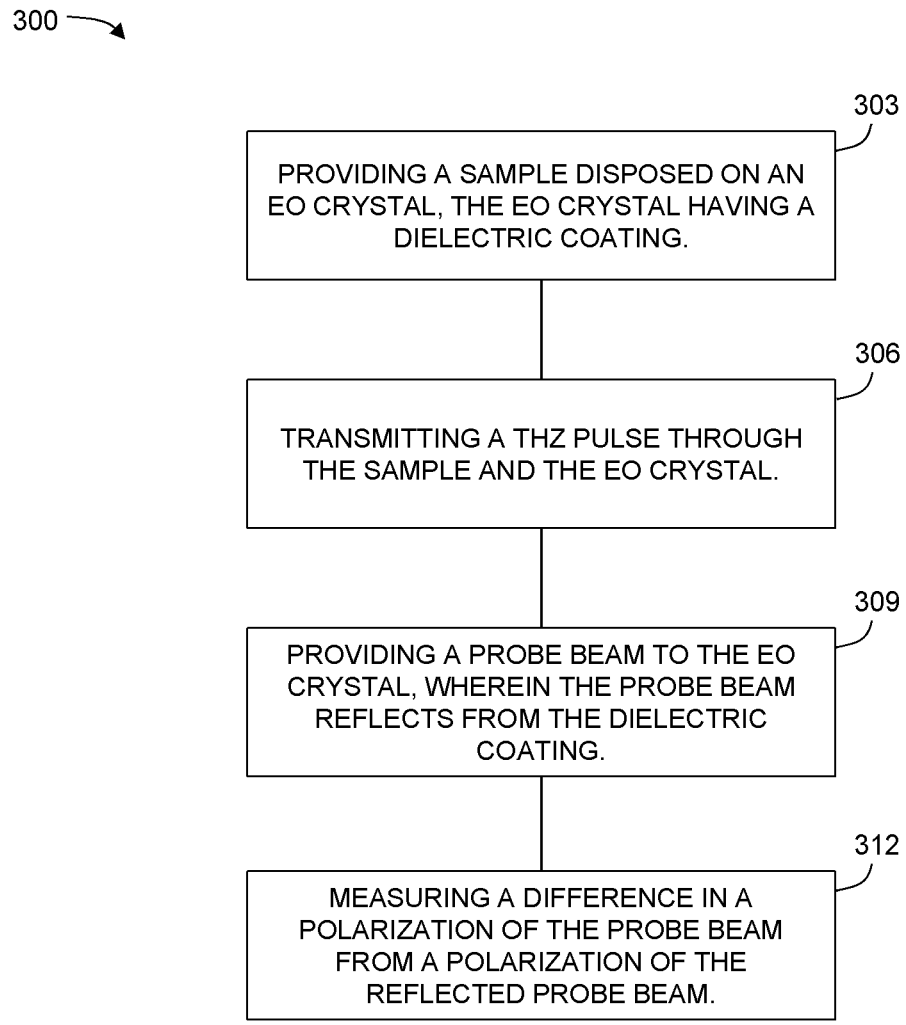
FIG. 11 is a chart depicting a method according to another embodiment of the present disclosure.

The present disclosure may be embodied as a method 300 for CATM (see, e.g., FIG. 11). The method 300 includes providing 303 a sample disposed on an EO crystal, wherein a sample surface of the EO crystal has a dielectric coating which is transmissive to THz and reflective to NIR, and the sample is disposed on the dielectric coating. A THz pulse is transmitted 306 through the sample and the EO crystal such that a birefringence of the EO crystal is changed according to the THz pulse (the THz pulse being changed by the structure of the sample as described above). A probe beam is provided 309 to the EO crystal, wherein the probe beam reflects from the dielectric coating and co-propagates through the EO crystal with the THz pulse. In this way, the change in bifringence of the EO crystal, caused by the THz pulse, changes a polarization of the probe beam. The method 300 includes measuring 312 a difference in a polarization of the probe beam from a polarization of the reflected probe beam, the difference caused by the THz pulse in the EO crystal.

Although the present disclosure has been described with respect to one or more particular embodiments, it will be understood that other embodiments of the present disclosure may be made without departing from the spirit and scope of the present disclosure.

What is claimed is:

1. An apparatus for Crystal Anisotropy Terahertz Microscopy ("CATM"), comprising:
   an emitter configured to emit a THz pulse;
   a detector configured to detect the THz pulse after the pulse is transmitted through a sample disposed on a sample surface of the detector; and
   a pulsed radiation generator for generating a probe beam to interrogate the detector; and
   a polarizer disposed in a path of the THz pulse between the emitter and the sample, wherein the polarizer is configured to polarize the THz pulse and is selectively rotatable; and
   wherein the probe beam has a polarization configured to rotate as a function of a rotation of the polarizer to provide a constant detector sensitivity.

2. The apparatus of claim 1, wherein the pulsed radiation generator is a laser configured to generate a probe beam in the infrared, near-infrared, or visible light regions of the spectrum.

3. The apparatus of claim 2, wherein the pulsed radiation generator is a titanium-sapphire laser.

4. The apparatus of claim 1, wherein the detector comprises an electro-optical ("EO") crystal configured to change in birefringence according to the THz pulse.

5. The apparatus of claim 4, wherein the EO crystal is a ZnTe crystal or a GaP crystal.

6. The apparatus of claim 4, wherein the sample surface of the detector has a dielectric coating which is transmissive to THz and reflective to NIR, and the sample is disposed on the dielectric coating.

7. The apparatus of claim 6, wherein the probe beam passes through the EO crystal and is reflected by the dielectric coating.

8. The apparatus of claim 7, further comprising a polarization detector for measuring a difference in a polarization of the probe beam from a polarization of the reflected probe beam caused by the THz pulse in the EO crystal.

9. The apparatus of claim 1, further comprising:
   a beam splitter for splitting a pump beam from the probe beam; and
   wherein the emitter is configured to be excited by the pump beam for emission of the THz pulse.

10. The apparatus of claim 1, further comprising a sample plate for holding the sample, wherein the sample plate is configured to be selectively rotated with respect to the detector.

11. The apparatus of claim 1, further comprising a hydration cell for maintaining hydration of the sample.

12. A method for CATM, comprising:
   providing a sample disposed on an EO crystal, wherein a sample surface of the EO crystal has a dielectric coating which is transmissive to THz and reflective to NIR, and the sample is disposed on the dielectric coating;
   transmitting a THz pulse through the sample and the EO crystal such that a birefringence of the EO crystal is changed according to the THz pulse; providing a probe beam to the EO crystal, wherein the probe beam reflects from the dielectric coating and co-propagates through the EO crystal with the THz pulse and wherein the probe beam has a polarization configured to rotate as a function of a rotation of the polarizer to provide a constant detector sensitivity; measuring a difference in a polarization of the probe beam from a polarization of the reflected probe beam, the difference caused by the THz pulse in the EO crystal.

* * * * *